United States Patent
Ueda

[11] Patent Number: 5,887,627
[45] Date of Patent: Mar. 30, 1999

[54] METHOD FOR RECONSTRUCTING CORRODED PIPES

[75] Inventor: Kouhei Ueda, Tokyo, Japan

[73] Assignee: Taisei Corporation, Tokyo, Japan

[21] Appl. No.: 870,913

[22] Filed: Jun. 6, 1997

[30] Foreign Application Priority Data

Jul. 2, 1996 [JP] Japan ................................. 8-191399

[51] Int. Cl.$^6$ ................................................ F16L 55/18
[52] U.S. Cl. ................................ 138/97; 138/98; 405/184
[58] Field of Search ...................... 138/97, 98; 405/150, 405/154, 146, 156, 184

[56] References Cited

U.S. PATENT DOCUMENTS

| | | | |
|---|---|---|---|
| 4,662,606 | 5/1987 | Akesaka | 254/29 R |
| 4,796,673 | 1/1989 | Ueda | 138/97 |
| 4,815,695 | 3/1989 | Akesaka | 254/29 R |
| 4,830,538 | 5/1989 | Ueda | 405/184 |
| 4,830,539 | 5/1989 | Akesaka | 405/184 |
| 4,848,407 | 7/1989 | Smith et al. | 138/97 |
| 5,190,705 | 3/1993 | Corazza | 138/97 |

FOREIGN PATENT DOCUMENTS

| | | |
|---|---|---|
| 31 29 870 A1 | 2/1983 | Germany . |
| 63-235782 A | 9/1988 | Japan . |
| 1-54594 B2 | 11/1989 | Japan . |
| 3-40270 B2 | 6/1991 | Japan . |
| 4-119279 A | 4/1992 | Japan . |
| 6-042679 | 2/1994 | Japan . |
| 6-094164 | 4/1994 | Japan . |
| 2560198 B2 | 9/1996 | Japan . |
| 9-71921 A | 3/1997 | Japan . |
| 3-30757 B2 | 5/1997 | Japan . |

*Primary Examiner*—Denise L. Ferensic
*Assistant Examiner*—James F. Hook
*Attorney, Agent, or Firm*—David W. Maher; Karl Bozicevic; Bozicevic & Reed LLP

[57] ABSTRACT

A method for reconstructing corroded pipes is disclosed in which a long, new pipe can be inserted smoothly and without excessive force, into an older pipe. The method involves the insertion of a new pipe into an old pipe using a dolly to transfer the reaction force. The tail end of the new pipe is attached to the dolly, and the front end of the new pipe is sealed off. A plug is inserted into the dolly from the tail end of the new pipe, which is filled with pressurized water. The dolly is then moved in the direction of the old pipe to insert the new pipe into the old pipe.

7 Claims, 5 Drawing Sheets

METHOD FOR RECONSTRUCTING CORRODED PIPES

RELATED APPLICATIONS

This application claims priority under 35 USC § 119 to Japanese Patent Application No. 8-191399, filed Jul. 2, 1996.

FIELD OF THE INVENTION

This invention relates generally to the field of pipe repair and more specifically relates to the reconstruction of corroded pipes. The invention further relates to a device and method for inserting a new pipe into an old pipe.

BACKGROUND OF THE INVENTION

Several methods have been developed for repairing corroded pipes (such as those laid on the ocean floor) by inserting new pipes into existing structures. The following published unexamined Japanese patent applications relate to pipe repair: JP No. Showa 63 (1988)-23578, JP No. Heisei 1 (1989)-54595, JP No. Heisei 3 (1991)-4027, and JP No. Heisei 3 (1991)-30757.

Conventional methods of reconstructing corroded pipes have several limitations. Efficient insertion of a new pipe into a pre-existing pipe requires that the length of new pipe being inserted be longer than the old pipe. However, there are limits regarding the distance to which a jack can be extended in order to advance a new pipe into a pre-existing pipe. In addition, during insertion the new pipe can lurch forward if the frictional resistance between the inner surface of the old pipe and the outer surface of the new pipe is broken. Thus there is a need for an improved method of reconstructing pipes.

SUMMARY OF THE INVENTION

The present invention provides an improved method for reconstructing corroded pipes. A new pipe is inserted into an existing pipe, using a dolly to transfer any reaction force to the old pipe. The tail end of the new pipe is inserted into the dolly. The front end of the new pipe is sealed off. A plug is then inserted into the dolly from the tail end of the new pipe. The new pipe is filled with pressurized water, and the dolly is moved in the direction of the old pipe thereby inserting the new pipe into the old pipe.

A feature of the present invention is that a coupling member of limited length is used to connect the dolly to the new pipe so that the new sections will not move suddenly when the static friction point is surpassed. This coupling member prevents the dolly and the new pipe from separating beyond a prescribed distance, and enables the dolly to follow the new pipe when pressure is applied.

Another feature of the present invention is that it uses pressurized water to effectively create a solid object out of the new pipe, thereby facilitating insertion.

Another feature is the use of a barrier member mounted on the front end of the inserted pipe. This barrier member enables water of a high specific gravity to be injected into the gap between the old and new pipes, thereby providing the inserted pipe with buoyancy. This buoyancy lowers the orthogonal resistance between the old and new pipes.

An advantage of the present invention is that the new pipe is smoothly inserted into an existing pipe without jarring or excessive motion. Another advantage of this invention is that the use of the old pipe makes the method more economical than conventional methods where new pipe is laid next to old pipe. Furthermore, the invention is more efficient and cost-effective as a longer length of pipe can be inserted during a single operation.

Another advantage of the present invention is that it is applicable to a broad range of pipe sizes, as the specific gravity of the heavy water can be adjusted. Thus a pipe of either a large or small cross-section can be adjusted to the optimum weight.

These and other objects, advantages, and features of the present invention will become apparent to those skilled in the art upon reading the present disclosure and viewing the accompanying drawings.

DETAILED DESCRIPTION OF THE PREFERRED EMBODIMENTS

Figure 1:
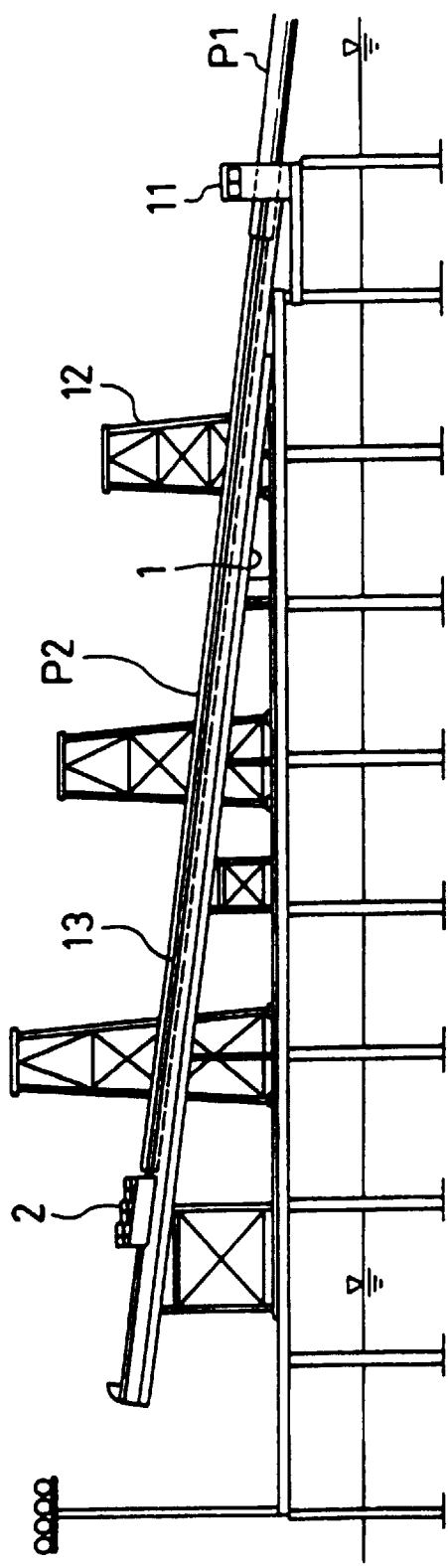
FIG. 1 illustrates the overall configuration of the device used for reconstructing a corroded pipe.

Before the present device for reconstructing corroded pipes is described, it is to be understood that this invention is not limited to the particular components and configurations specifically shown in the drawings and described herein, as such components and configurations may, of course, vary. It is also to be understood that the terminology used herein is used for describing particular embodiments only, and is not intended to be limiting since the scope of the present invention will be limited only by the appended claims. The accompanying diagrams provide reference for illustrating the inherent processes of this invention in reconstructing a corroded pipe.

Referring to FIG. 1, the overall configuration of a device used in one embodiment can be seen. One end of an existing, old pipe P1 is lifted and supported by retaining section 11 on a platform 1. For pipes buried on the ocean floor, a segment of the existing old pipe P1, is uncovered, cut and raised up to retaining section 11 on platform 1. Platform 1, which doubles as a work platform, is built above the water surface on an incline. A rail 13, along which pressure dolly 2 runs, is installed on top of platform 1. Dolly 2 is loaded onto rail 13 and moved to the top. New pipe P2 is attached to pressure dolly 2 and inserted into existing pipe P1 from this raised end. The inserted end of new pipe P2 is sealed off prior to insertion. The return movement of dolly 2 down the rail inserts new pipe P2 into the open end of old pipe P1. A hoisting device 12 adjacent to work platform 1 supports new pipe P2.

Figure 2:
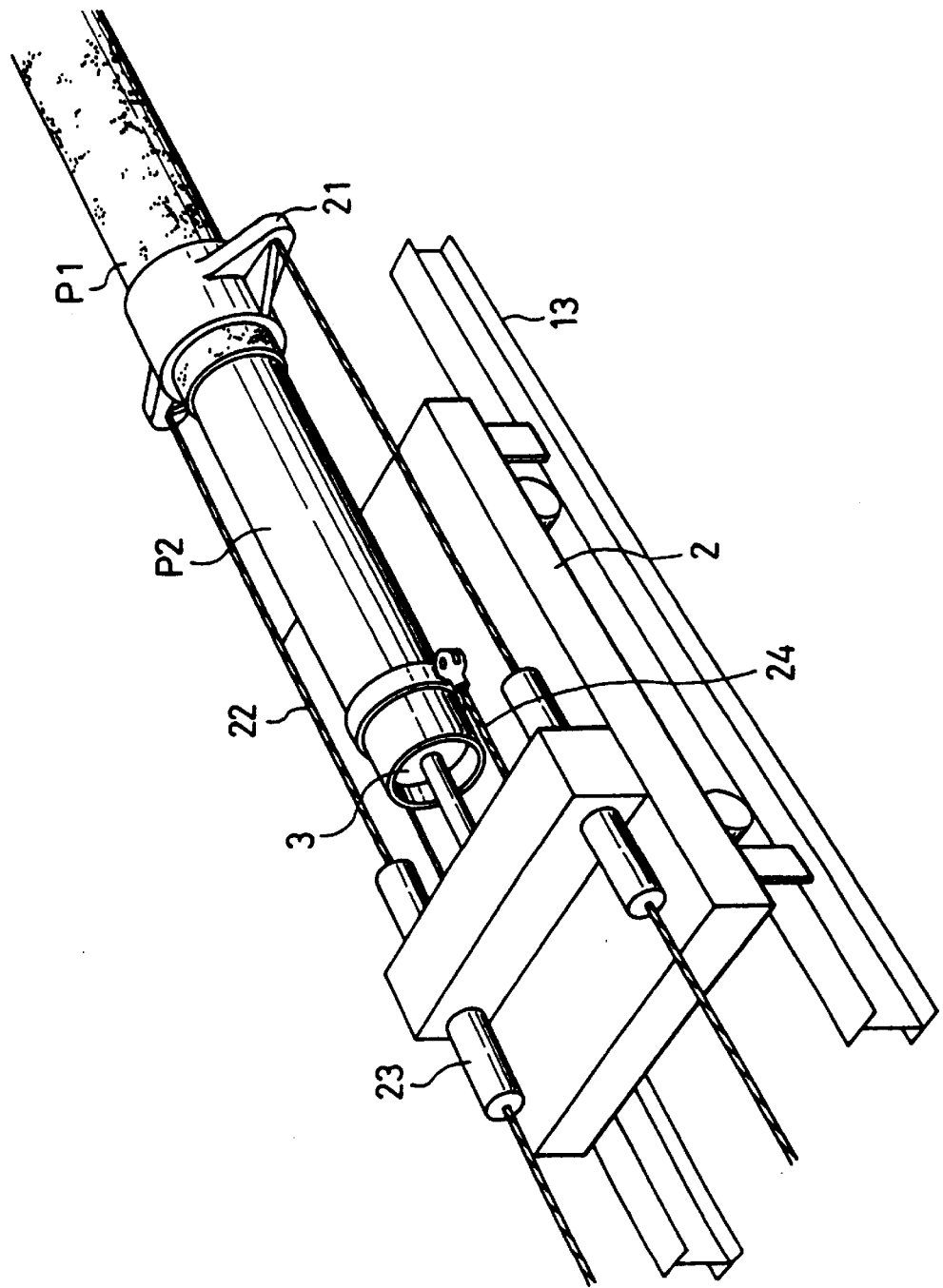
FIG. 2 illustrates the dolly and connections used for inserting new pipe into the old pipe.

The conditions for inserting new pipe P2 into old pipe P1 can be seen in FIG. 2. The dolly 2 provides the necessary motive force to advance new pipe P2 into old pipe P1. To move the dolly, reaction force pad 21 is mounted around a section of old pipe P1. Two central-hole jacks 23 are attached on either side of dolly 2, and one end of steel cable 22 is threaded through each jack 23 at either side of reaction force pad 21, which is attached to steel cable 22. Repeated extension, gripping and releasing actions of jack 23 forcefully moves dolly 2 down the rail towards the reaction force pad, thereby providing the force to insert new pipe P2 into old pipe P1.

To insert multiple sections of new pipe P2, after the first section is inserted in old pipe P1 as described, another section is welded onto the tail end of the first section of new pipe P2 and inserted. This welding and insertion process is repeated to extend the new pipe to the required length.

New pipe P2 is coupled to dolly 2 by means of plug 3, which is inserted at the tail end of the new pipe. Specifically, plug 3 has an external diameter equal to the inner diameter of new pipe P2 is set on the front face of the dolly (the face closest to existing pipe p1). New pipe P2 is filled with water and pressurized. Consequently, the water pressure will be greater than the force that the pressure of dolly 2 exerts on plug 3. The feeding of pressurized water 32 in effect creates one, long, solid object from new pipe P2. The undiminished force from the pressure of dolly 2 on plug 3 acts on the front end of new pipe P2 so that new pipe P2 acts as if it were being pulled rather than pushed into old pipe P1. By moving the dolly 2 forward, new pipe P2 is inserted and further advances into existing pipe P1.

Figure 3:
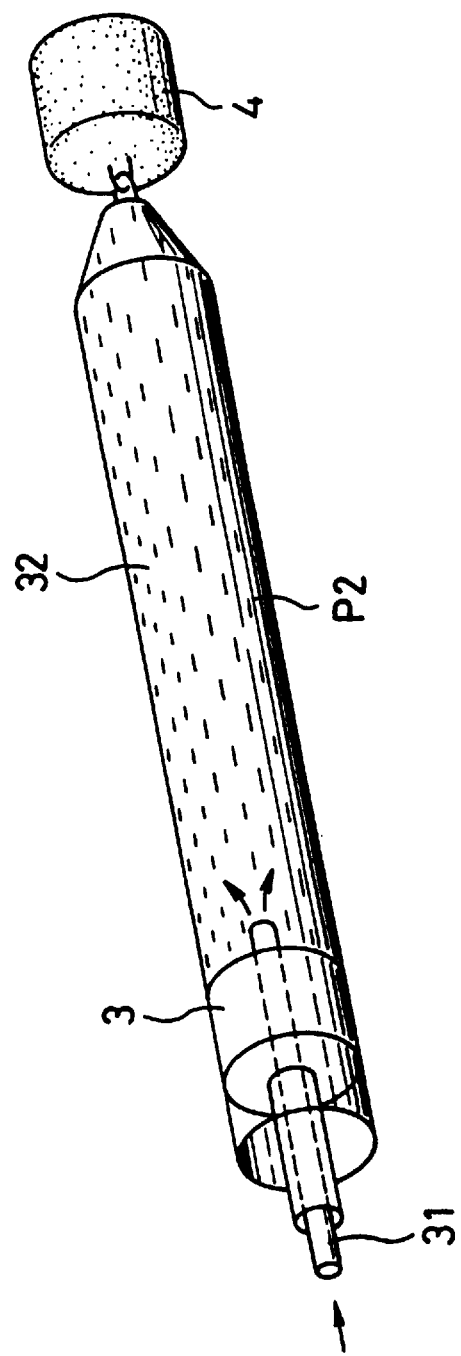
FIG. 3 illustrates the configuration for charging the new pipe with pressurized water.

Referring now to FIG. 3, a description of the delivery of pressurized water into the new pipe is provided. Pressurized water is fed into new pipe P2 by, for example, installing water pipe 31 through plug 3, and feeding pressurized water 32 into new pipe P2, which has been sealed by aforementioned Plug 3.

Figure 4:
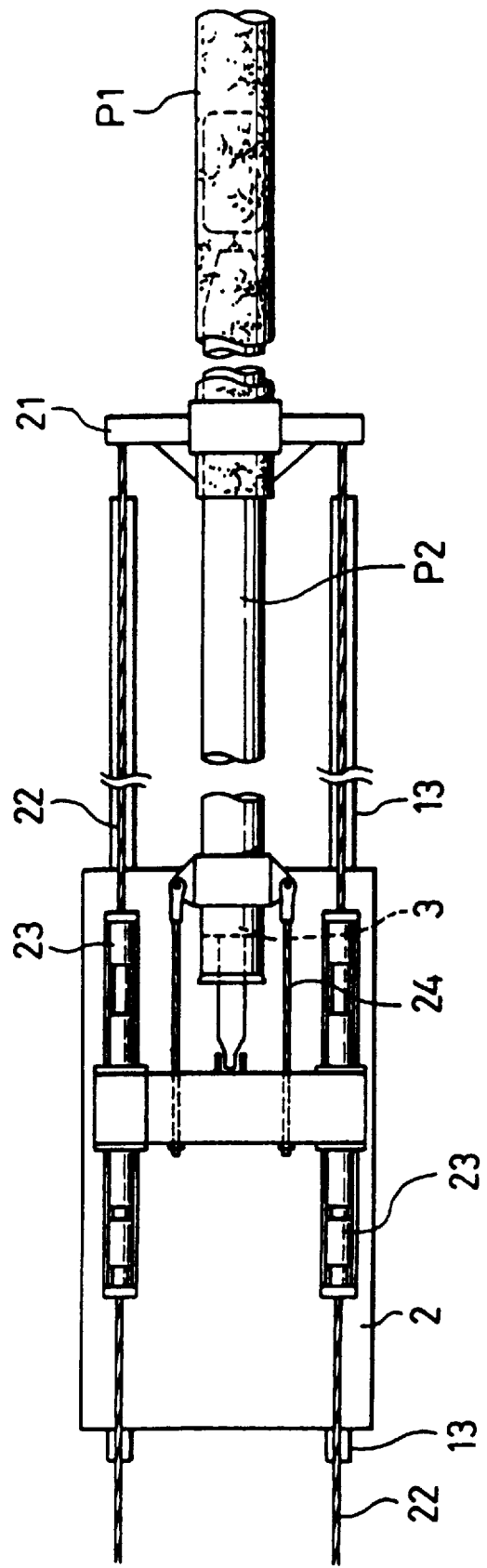
FIG. 4 is a planar diagram (top view) of conditions for inserting the new pipe into the old pipe.
Figure 5:
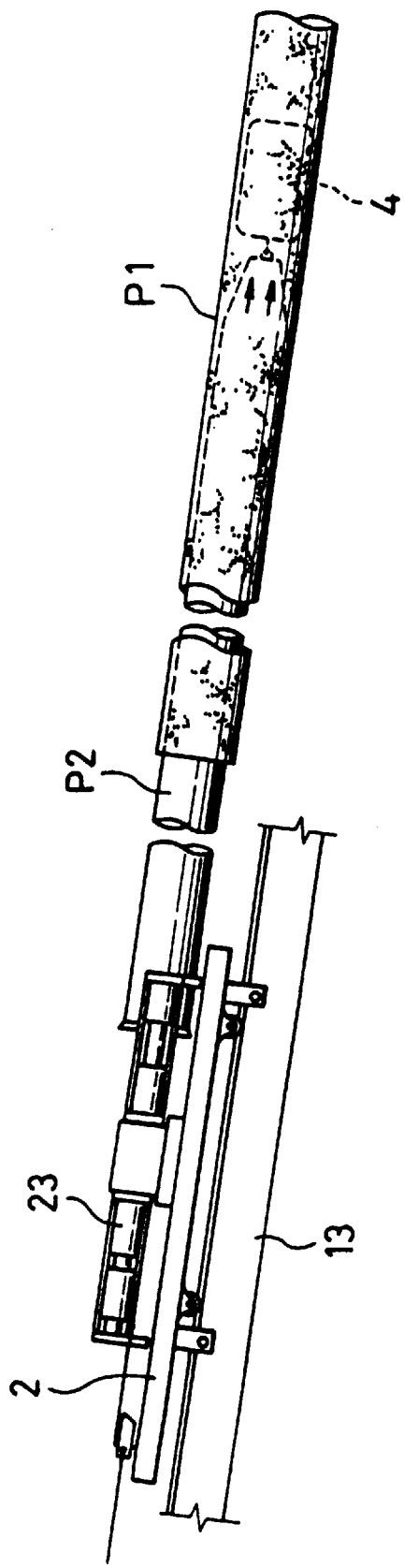
FIG. 5 is a planar diagram (side view) of conditions for inserting the new pipe into the old pipe.

FIGS. 4 and 5 provide additional views of the device used in the method for inserting the new pipe into the old pipe. Jack 23 is mounted on pressure dolly 2. Through the repeated extension, gripping and releasing processes of center-holed jack 23, in tandem with the reaction force taken up by steel cables 22, dolly 2 is moved forcefully along. With plug 3 protruding at the front end of dolly 2, the movement of the dolly exerts a force on the plug. This same force acts on the front end of new pipe P2 via pressurized water 32. As a result, despite the pressure acting on its tail end, new pipe P2 is inserted into pre-existing pipe P1 as if its front end were being pulled.

Pressure dolly 2 moves along the whole length of rail 13, which is installed upon platform 1, shown in FIG. 1. As such, a long section of new pipe P2, limited only by the length of the rail, can be inserted into old pipe P1. Rail 13 is longer than the length of any added section of new pipe P2, such that the steel cables 22 and jacks 23 can move dolly 2 along its entire length.

Referring back to FIGS. 4 and 5, the use of heavy water in one aspect of the invention can be seen. In order to reduce the load of new pipe P2, water of a high specific gravity can be charged into the minute gap between old pipe P1 and new pipe P2. This causes a buoyancy of new pipe P2, based on the specific gravity of the heavy water and of new pipe P2, which lowers the orthogonal resistance of new pipe P2 during insertion.

However, heavy water is expensive, and it would be extravagant to inject water to fill the entire volume over the whole length of pre-existing pipe P1, only to have it rush out the open end of pre-existing pipe P1 as new pipe P2 advances. Accordingly, in one embodiment barrier member 4 is attached to new pipe P2 (see FIG. 3). Preferably, barrier member 4 is chained to new pipe P2. However other means can be used to attach barrier member 4 to the front end of new pipe P2.

Barrier member 4 is a cylindrical body of a diameter larger than old pipe P 1. Barrier member 4 is formed from a flexible material. Any flexible material can be used to form barrier member 4. Barrier member 4 is pushed by and moves ahead of new pipe P2, thus blocking off the area in front of it. As a result, heavy water need only be injected behind barrier member 4. In other words only the space around the circumference of new pipe P1 need be charged with heavy water. This greatly reduces the volume of heavy water which must be used.

The insertion of new pipe P2 requires the welding of pipe sections and other operations, and the whole length of the pipe cannot be inserted in one continuous operation (see FIGS. 4 and 5). It is possible that, as each new section is inserted, new pipe P2 could lurch forward instantaneously, at the moment the point of static friction is surpassed. To prevent excessive movement, dolly 2 and the tail end of new pipe P2 are preferably connected by coupling member 24, which is limited in length. Preferably, steel cables are used for coupling member 24. However, coupling member 24 is not limited to steel cables; other means can also be used. For example, a rod for which the position can be varied can be used as coupling member 24. Alternatively, a flexible member can also be used to couple dolly 2 to new pipe P2. The presence of coupling member 24 prevents dolly 2 and new pipe P2 from separating beyond a prescribed distance, and it enables dolly 2 to follow new pipe P2 during any slight shift in position when pressure is applied.

Insertion of new pipe P2 stops when pressure dolly 2 reaches the lower end of rail 13; that is, near the open end of pre-existing pipe P1. After inserting the section of new pipe P2, dolly 2 is reversed and raised to the opposite end of rail 13. For this, a winch can be set on the rear end of rail 13, and, as the cable is wound around the winch, dolly 2 is raised to the upper limit of rail 13 (see FIG. 1). Next, hoisting device 12 is used to raise the next section of new pipe P2, and the front end of the next section of new pipe P2 is welded onto the tail end of the recently inserted section of new pipe P2. A process of welding another section onto new pipe P2 and inserting it is repeated until the new pipe P2 is pushed out the other end of pre-existing pipe P1, thereby completing the reconstruction process.

What is claimed is:

1. A method for reconstructing a corroded pipe comprising:
    a) providing first and second pipes, the first pipe having a front end and a tail end, the front end being sealed, and the first pipe fitting within the second pipe;
    b) providing a dolly movably connected to the second pipe and retractably extending therefrom in the direction from which the first pipe is to be inserted, the dolly having an attached plug having an external diameter equal to an inner diameter of the first pipe;
    c) connecting the first pipe to the dolly by inserting the attached plug into the tail end of the first pipe;
    d) filling the first pipe with pressurized water;
    e) moving the dolly toward the second pipe so as to insert the front end of the first pipe inside the second pipe.

2. The method of claim 1, wherein the dolly and the tail end of the first pipe are further linked by a coupling member limited in length, thereby restricting the separation of the dolly and the new pipe.

3. The method of claim 1, wherein the dolly additionally comprises a central-hole jack assembly mounted on the dolly, the central hole jack assembly comprising a central hole jack and steel cables attached at one end to the central hole jack, and the steel cables attached at a second end to the second pipe, and wherein step e) is accomplished by the repeated extension, gripping, and releasing of the steel cables by the jack.

4. The method of claim 1, further comprising the step of:
f) providing a work platform over the second pipe, wherein the platform comprises a lower end supporting the second pipe and a raised end elevated above the level of the second pipe.

5. The method of claim 4, wherein the platform further comprises a retaining section, which supports the second pipe, and a rail, which is mounted from the lower end of the platform extending towards the raised end, and wherein the dolly is movably mounted on the rail;

said method further comprising the steps of:
g) hoisting the first pipe onto the platform, and onto the rail;

h) loading the dolly with the new pipe and raising the dolly to the raised end of the platform;
i) inserting the front end of the first pipe into the second pipe; and
j) running the dolly down the platform so as to insert the first pipe into the second pipe.

6. The method of claim 1, wherein a barrier member is attached to the front end of the first pipe, wherein the barrier member is of sufficient diameter to block off the cross-section of the second pipe during insertion.

7. The method of claim 6, further comprising the step of:
k) injecting heavy water behind the barrier member during insertion of the first pipe.

* * * * *